(12) United States Patent
Gao et al.

(10) Patent No.: US 11,887,362 B2
(45) Date of Patent: Jan. 30, 2024

(54) SKY FILTER METHOD FOR PANORAMIC IMAGES AND PORTABLE TERMINAL

(71) Applicant: ARASHI VISION INC., Shenzhen (CN)

(72) Inventors: Ruidong Gao, Shenzhen (CN); Ying Zhou, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 342 days.

(21) Appl. No.: 17/257,582

(22) PCT Filed: Jul. 2, 2019

(86) PCT No.: PCT/CN2019/094450
§ 371 (c)(1),
(2) Date: Jan. 3, 2021

(87) PCT Pub. No.: WO2020/007307
PCT Pub. Date: Jan. 9, 2020

(65) Prior Publication Data
US 2021/0272245 A1    Sep. 2, 2021

(30) Foreign Application Priority Data

Jul. 3, 2018    (CN) .......................... 201810711718.X

(51) Int. Cl.
*G06V 20/10*    (2022.01)
*G06T 7/30*    (2017.01)
(Continued)

(52) U.S. Cl.
CPC .............. *G06V 20/10* (2022.01); *G06T 5/002* (2013.01); *G06T 7/30* (2017.01); *G06V 10/17* (2022.01);
(Continued)

(58) Field of Classification Search
CPC ...... G06V 20/70; G06V 10/774; G06V 10/17; G06V 10/77; G06V 20/10; G06V 10/80;
(Continued)

(56) References Cited

U.S. PATENT DOCUMENTS 8,611,696 B1    12/2013  Zhu et al.
11,019,283 B2*  5/2021   Carter ..................... G06V 20/42
(Continued)

FOREIGN PATENT DOCUMENTS

CN    101425137 A    5/2009
CN    103927720 A    7/2014
(Continued)

OTHER PUBLICATIONS

Yi-Hsuan Tsai, Xiaohui Shen, Zhe Lin, Kalyan Sunkavalli, Ming-Hsuan Yang; "Sky Is Not the Limit: Semantic-Aware Sky Replacement", ACM Transactions on Graphics, Jul. 2016, pp. 1-11, vol. 35, No. 4, Article 149, Association for Computing Machinery (ACM), U.S.

(Continued)

*Primary Examiner* — Gandhi Thirugnanam
(74) *Attorney, Agent, or Firm* — Cheng-Ju Chiang

(57) ABSTRACT

A sky filter method for panoramic images and a portable terminal is provided. The method comprises: obtaining several panoramic images containing sky regions as a data set, and marking a sky region and a ground region of each panoramic image to obtain a marked mask image and a panoramic template image of sky; extracting features of the sky region and the ground region of each panoramic image, and marking a positive sample and a negative sample; inputting the positive sample and the negative sample to SVM for training to obtain a model; extracting the features of the panoramic images, and inputting same to the model to obtain an initial mask image; removing a misclassified pixel (Continued)

and a misclassified region in the initial mask image to obtain an accurate mask image; and fuse the panoramic template image of sky and a test panoramic image to achieve a sky filter effect.

10 Claims, 2 Drawing Sheets

(51) Int. Cl.
- *G06T 5/00* (2006.01)
- *G06V 10/10* (2022.01)
- *G06V 10/764* (2022.01)
- *G06V 10/774* (2022.01)
- *G06V 10/80* (2022.01)
- *G06V 10/26* (2022.01)

(52) U.S. Cl.
CPC ............ *G06V 10/26* (2022.01); *G06V 10/764* (2022.01); *G06V 10/774* (2022.01); *G06V 10/80* (2022.01); G06T 2207/20032 (2013.01); G06T 2207/20081 (2013.01); G06T 2207/20221 (2013.01); *G06V 10/16* (2022.01)

(58) Field of Classification Search
CPC ...... G06V 10/56; G06V 10/70; G06V 10/764; G06V 30/1918; G06V 10/98; G06T 2207/20081; G06T 2207/20032; G06T 2207/10024; G06T 5/002; G06T 7/30; G06T 2207/20028; G06T 2207/20024; G06K 9/6288; G06K 9/6267
See application file for complete search history.

(56) References Cited

U.S. PATENT DOCUMENTS

| | | | | |
|---|---|---|---|---|
| 2005/0123183 | A1* | 6/2005 | Schleyer | G06T 5/50 382/254 |
| 2012/0133639 | A1* | 5/2012 | Kopf | G06T 3/4038 345/419 |
| 2017/0236287 | A1 | 8/2017 | Shen et al. | |
| 2017/0294000 | A1* | 10/2017 | Shen | G06T 5/005 |
| 2021/0272245 | A1* | 9/2021 | Gao | G06V 20/10 |

FOREIGN PATENT DOCUMENTS

| | | | | |
|---|---|---|---|---|
| CN | 104683767 | A | | 6/2015 |
| CN | 105023260 | A | | 11/2015 |
| CN | 105528575 | A * | 4/2016 | ......... G06K 9/00503 |
| CN | 105608667 | A | | 5/2016 |
| CN | 106875351 | A | | 6/2017 |
| CN | 107317967 | A | | 11/2017 |
| CN | 107622280 | A | | 1/2018 |
| CN | 107784629 | A | | 3/2018 |
| CN | 107833185 | A | | 3/2018 |
| CN | 108093174 | A | | 5/2018 |
| CN | 109003237 | A | | 12/2018 |
| JP | 2003-157438 | A | | 5/2003 |
| JP | 2004-240732 | A | | 8/2004 |
| JP | 2007-517315 | A | | 6/2007 |
| JP | 2010-41288 | A | | 2/2010 |
| JP | 2010156815 | A * | 7/2010 | |
| JP | 2013-26939 | A | | 2/2013 |
| JP | 2016-92518 | A | | 5/2016 |
| WO | 2016/199209 | A1 | | 12/2016 |

OTHER PUBLICATIONS

Tianyi Mao; "Dark Primary Color Prior Defogging Optimization Based on Sky Region Segmentation", China Master's Theses Full-Text Database, Science and Technology Section, Mar. 15, 2018, Chapter 3, pp. 16-32, vol. 3, China Academic Journals Electronic Publishing House, China.

Wencheng Wang, Faliang Chang; "A Multi-Focus Image Fusion Method Based on Laplacian Pyramid", Journal of Computers, Dec. 2011, pp. 2559-2566, vol. 6, Issue No. 12, Academy Publisher.

* cited by examiner

US 11,887,362 B2

SKY FILTER METHOD FOR PANORAMIC IMAGES AND PORTABLE TERMINAL

CROSS REFERENCE TO RELATED APPLICATIONS

The present application is a 35 U.S.C. § 371 National Phase conversion of International (PCT) Patent Application No. PCT/CN2019/094450, filed on Jul. 2, 2019, which claims priority of Chinese Patent Application No. 201810711718.X, filed on Jul. 3, 2018, the disclosure of which is incorporated by reference herein. The PCT International Patent Application was filed and published in Chinese.

FIELD OF THE INVENTION

The invention relates to the field of image processing, and particularly relates to a sky filter method for panoramic images and a portable terminal.

BACKGROUND OF THE INVENTION

Sky filter technology can produce a realistic natural sky effect, replace the sky background of the image with the desired sky effect, and create a more realistic picture. The realization effect of the sky filter technology is closely related to the accuracy of the sky detection algorithm.

The current sky recognition algorithm based on color priori is faster, but the recognition accuracy is low. This is because the color of the sky will change significantly in different time periods and different weather conditions, the color-based sky recognition algorithm cannot adapt to the change of sky color. The sky recognition algorithm based on priori gradient assumes that the gradient changes in the sky area are relatively smooth. The algorithm optimizes by constructing an energy function to obtain a continuous area with a smoother gradient in the image, which is the sky area. However, when there are clouds in the sky, there are obvious gradient changes in the sky, and the assumption of this algorithm is no longer valid. Therefore, the sky recognition algorithm based on priori gradient is not suitable for such situation where there are attachments such as clouds and sun in the sky. The reason is that the above algorithm only uses limited priori knowledge when detecting the sky, and cannot cover variety of sky changes.

Technical Problem

The present invention proposes a sky filter method, a computer readable storage medium and a portable terminal for panoramic images, which aim to allow the sky in the image to be replaced with different sky backgrounds, generate a realistic sky fused in the picture, improve the detection accuracy of current sky defection method, and achieve a more realistic sky filter effect.

Technical Solutions

According to a first aspect, the present invention provides a sky filter method for panoramic images, comprising steps of:

obtaining several panoramic images containing sky regions as a data set, and marking a sky region and a ground region of each of the panoramic images in the data set, so as to obtain a marked mask image corresponding to each of the panoramic images in the data set, and obtaining a panoramic sky template image;

respectively extracting features of the sky region and the ground region of each of the panoramic images in the data set according to the marked mask images, and marking a positive sample and a negative sample of each of the panoramic images;

sequentially inputting the positive sample and the negative sample of each of the panoramic images in the data set to a support-vector machine (SVM) for training, so as to obtain a model;

extracting features of a test panoramic image, and inputting the features to the model, so as to obtain an initial mask image in which sky pixels and ground pixels are marked;

removing misclassified pixels and misclassified regions in the initial mask image, so as to obtain a corresponding accurate mask image; and fusing the panoramic sky template image and the test panoramic image on the basis of the accurate mask image using a multi-resolution fusion algorithm, so as to achieve a sky filter effect.

Optionally, the pixel value of the sky region in the marked mask image is marked as 1 and the pixel value of the ground region is marked as 0.

Optionally, the features comprise a first feature set and a second feature set; the first feature set includes: R channel value, G channel value, B channel value, and local variance; the second feature set includes: B/G value, B/R value and a product of a row coordinate and the local variance; mark the first feature set and the second feature set of the sky region as positive samples, and mark the first feature set and the second feature set of the ground region as negative samples.

Optionally, the step of removing misclassified pixels and misclassified regions in the initial mask image, so as to obtain a corresponding accurate mask image, specifically comprises steps of:

performing median filtering on the initial mask image; and based on the prior knowledge of the sky in the upper part of the image and the ground in the lower part of the image, filtering out misclassified single pixels, the method is setting the weight of the pixel (x, y) to p:

$$p = \left(1 - \frac{y}{H}\right)^3, y \in (0, H-1)$$

where H is the height of the image, W is the width of the image: x∈(0,W−1);

convoluting and thresholding the initial mask image by using the weight map to obtain an initial mask image with noise removed; and Optionally, the step of removing the misclassified regions in the sky region and the ground region to obtain an accurate mask image, further comprises steps of: detecting the connected domains of the initial mask image with noise removed by using two-pass algorithm, calculating the area S1 of each connected domain in the sky region in the upper part of the image, setting the minimum sky area threshold th1, and dividing according to the following formula:

$$\text{area of connected domain to be detected in the sky region} = \begin{cases} \text{sky region,} & S_1 \geq th1 \\ \text{non-sky region,} & S_1 < th1 \end{cases}$$

where the value of S1 can be calculated as the number of pixels in each connected domain in the sky region, and the threshold th1 is 1/40 of the image area;

removing the misclassified regions in the sky region and the ground region to obtain an accurate mask image.

Optionally, the step of fusing the panoramic sky template image and the test panoramic image on the basis of the accurate mask image by using a multi-resolution fusion algorithm, so as to achieve a sky filter effect, comprising: constructing the Laplacian pyramid on the panoramic sky template image and the test panoramic image by using the multi-resolution fusion algorithm; constructing the Gaussian pyramid on the accurate mask image, and by using the constructed Gaussian pyramid to merge the panoramic sky template image and the test panoramic image in which the Laplacian pyramid is constructed, and reconstructing the fused image layer by layer to achieve a sky filter effect.

calculating the area S2 of each connected domain in the ground region in the lower part of the image, setting the minimum ground area threshold th2, and dividing according to the following formula:

$$\text{area of connected domain to be detected in the non-sky region} = \begin{cases} \text{sky region,} & S_2 \geq th2 \\ \text{non-sky, region} & S_2 < th2 \end{cases}$$

where the value of S2 can be calculated as the number of pixels in each connected domain in the ground region, and the threshold th2 is ½ of the maximum area of the ground connected domain; and obtaining the accurate mask image of sky region by means of the above division, and completing the detection of the sky region.

According to a second aspect, the present invention provides a computer-readable storage medium that stores one or more computer programs when the one or more computer programs are executed by a processor, cause the processor to perform steps of the above-mentioned sky filter method for panoramic images.

According to a third aspect, the present invention provides a portable terminal, comprising:

one or more processors;

a memory; and one or more computer programs, where the one or more computer programs are stored in the memory and are configured to be executed by the one or more processors, when the processor executes the computer program, perform steps of the above-mentioned sky filter method for panoramic images.

Advantages

In the present invention, the sky region in the panoramic image is detected by the machine learning algorithm, which improves the accuracy of automatic sky detection, and the multi-resolution fusion algorithm is used to fuse the panoramic sky template image and the panoramic image to achieve the sky filter effect.

DETAILED DESCRIPTION OF THE INVENTION

The foregoing objects, technical solutions and advantages of the invention will be much clearer from the following detail description taken with the accompanying drawings and embodiments. It should be understood that the specific embodiments described herein are only used to explain the present invention and are not intended to limit the present invention.

In order to explain the technical solutions of the present invention, the following will be described by specific embodiments.

First Embodiment

Figure 1:
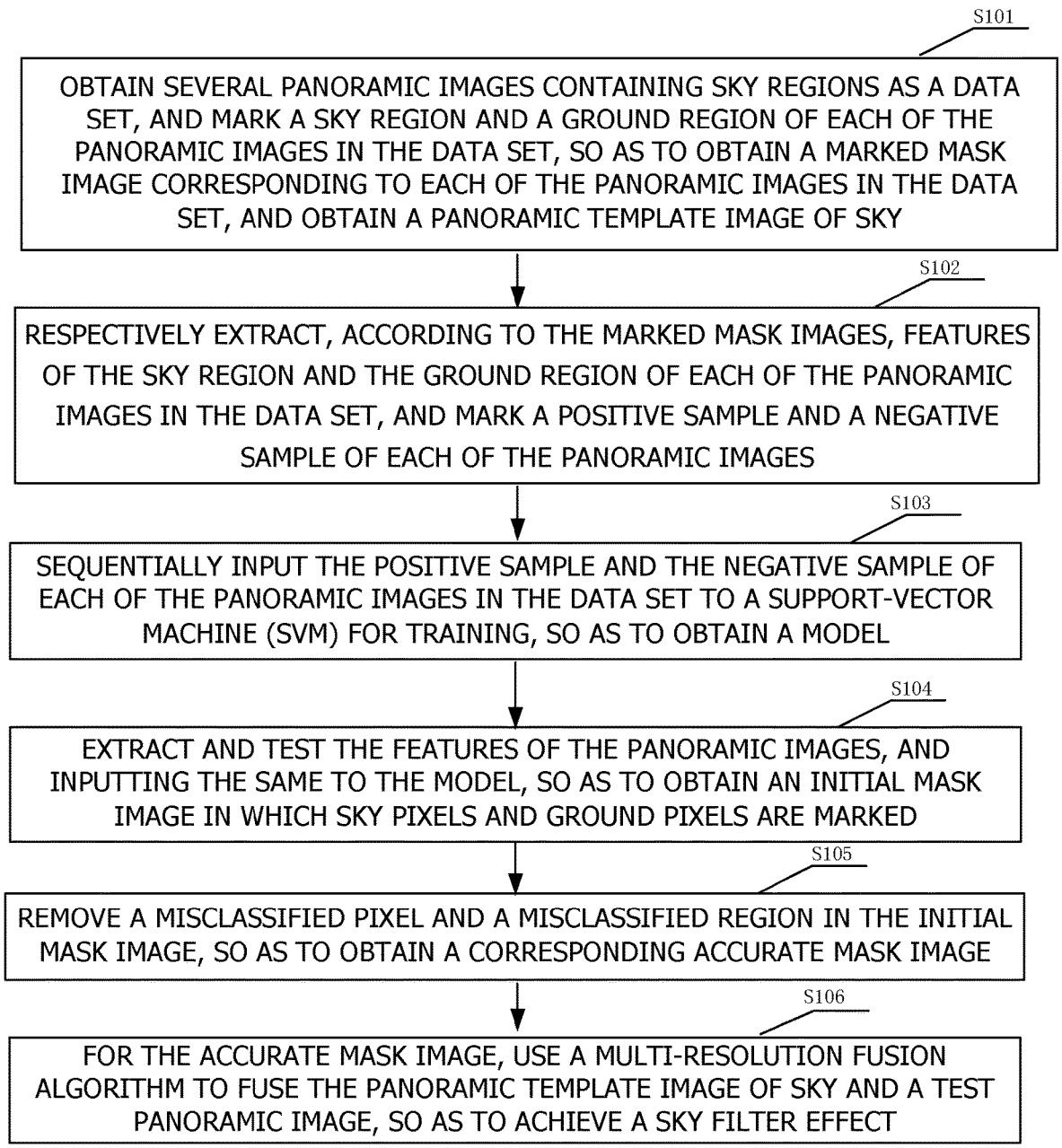
FIG. 1 is process diagram of a sky filter method for panoramic images in accordance with a first embodiment of the present invention.
Figure 2:
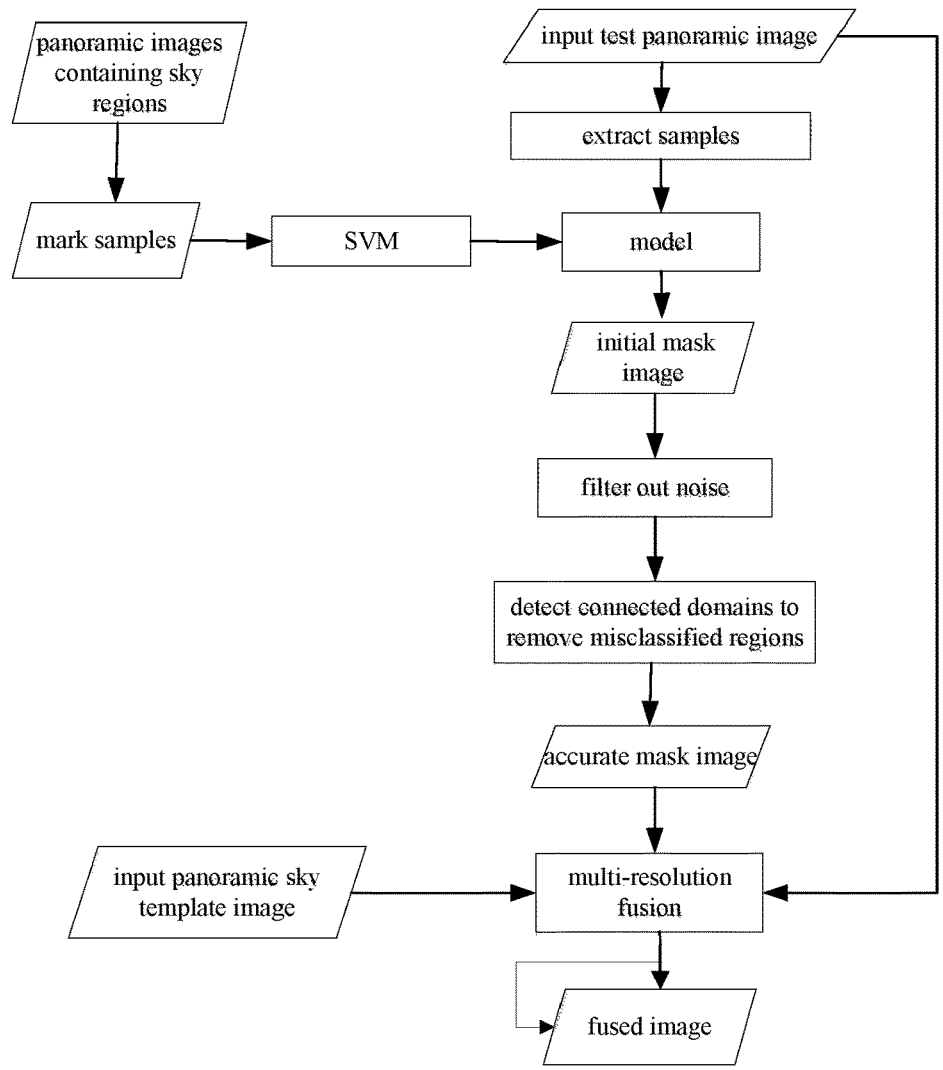
FIG. 2 is a flowchart of the sky filter method for panoramic images in accordance with the first embodiment of the present invention.

Referring to FIGS. 1 and 2, the first embodiment of the present invention provides a sky filter method for panoramic images, comprising steps of S101 to S106:

S101, obtaining several panoramic images containing sky regions as a data set, and marking a sky region and a ground region of each of the panoramic images in the data set, so as to obtain a marked mask image corresponding to each of the panoramic images in the data set, and obtaining a panoramic sky template image;

where the data set include more than 1,000 panoramic images. The size of each of the panoramic images is the same; the more panoramic images, the better; the sky region of each panoramic image in the data set contains the sky, clouds, and sun, etc; the ground region is outside the sky region; the data sets also include many different scenes and landforms, for example, scenes in time include early morning, noon, and evening time periods, and scenes of different weather conditions include sunny, cloudy, overcast, light rain and smog, etc.;

the pixel value of the sky region in the marked mask image is marked as 1 and the pixel value of the ground region is marked as 0.

The panoramic sky template image is a preset panoramic image containing only the sky, and is used as a template of sky filter.

S102, respectively extracting features of the sky region and the ground region of each of the panoramic images in the data set according to the marked mask images, and marking a positive sample and a negative sample of each of the panoramic images;

the features comprise a first feature set and a second feature set; the first feature set includes: R channel value, G channel value, B channel value, and local variance; the second feature set includes: B/G value, B/R value and a product of a row coordinate and the local variance. The first feature set is independent features, and the second feature set is combined features. Mark the first feature set and second feature set of the sky region as positive samples, and mark the first feature set and the second feature set of the ground region as negative samples.

S103, sequentially inputting the positive sample and the negative sample of each of the panoramic images in the data set to a support-vector machine (SVM) for training, so as to obtain a model;

support vector machine (SVM) theory is a feedforward neural network first proposed by Vapnik et al. in 1995. It is a new pattern recognition method developed on the basis of statistical learning theory. SVM is a classification model which shows many unique advantages in solving small sample, nonlinear and high-dimensional pattern recognition problems.

S104, extracting features of a test panoramic image, and inputting the features to the model, so as to obtain an initial mask image in which sky pixels and ground pixels are marked;

extracting features of a test panoramic image, where the features include the first feature set and the second feature set in step S102. Inputting the features into the trained model, marking pixels with output of 1 from the SVM classifier as sky pixels, and marking pixels with output of 0 as non-sky pixels, so as to obtain an initial mask image in which sky pixels and ground pixels are marked.

S105, removing misclassified pixels and misclassified regions in the initial mask image, so as to obtain a corresponding accurate mask image;

S105 can specifically comprises the flowing steps of S1051 to S1053:

S1051, performing median filtering on the initial mask image; and based on the prior knowledge of the sky in the upper part of the image and the ground in the lower part of the image, filtering out misclassified single pixels.

The median filter was proposed by Turky in 1971. The basic idea is to sort the pixels in a local area by gray level, and take the median value of the gray level in this area as the gray value of the current pixel, and use a window W scanning and sorting on the image, where the median value g at the pixel point (in, n) can be expressed as:

$$g(m,n)=\text{Median}\{f(m-k,n-l)\}$$

where W is a window of 3*3 or 5*5, $f(m-k, n-l)$ is the value at the pixel point $(m-k, n-l)$, $(k, l) \in W$; the method is setting the weight of the pixel (x, y) to p:

$$p = \left(1 - \frac{y}{H}\right)^3, y \in (0, H-1)$$

where H is the height of the image, W is the width of the image: $x \in (0, W-1)$;

S1052, convoluting and thresholding the initial mask image by using the weight map to obtain an initial mask image with noise removed; and S1053, removing the misclassified regions in the sky region and the ground region to obtain an accurate mask image.

Detecting the connected domains of the initial mask image by using two-pass algorithm, calculating the area S1 of each connected domain in the sky region in the upper part of the image, setting the minimum sky area threshold th1, and dividing according to the following judgment rules:

$$\text{area of connected domain to be detected in the sky region} = \begin{cases} \text{sky region,} & S_1 \geq th1 \\ \text{non-sky region,} & S_1 < th1 \end{cases}$$

where S1 is the number of pixels in each connected domain in the sky region, and the minimum sky area threshold th1 is 1/40 of the image area.

Calculating the area S2 of each connected domain in the ground region in the lower part of the image, setting the minimum ground area threshold th2, and dividing according to the following judgment rules:

$$\text{area of connected domain to be detected in the non-sky region} = \begin{cases} \text{sky region,} & S_2 \geq th2 \\ \text{non-sky, region} & S_2 < th2 \end{cases}$$

where the value of S2 can be calculated as the number of pixels in each connected domain in the ground region, and the minimum ground area threshold th2 is 1/2 of the maximum area of the ground connected domain.

Through the above judgment, removing the misclassified sky regions, and obtaining the accurate mask image.

S106, fusing the panoramic sky template image and the test panoramic image on the basis of the accurate mask image by using a multi-resolution fusion algorithm, so as to achieve a sky filter effect;

S106 may specifically be:

constructing the Laplacian pyramid on the panoramic sky template image and the test panoramic image by using the multi-resolution fusion algorithm; constructing the Gaussian pyramid on the accurate mask image, and using the constructed Gaussian pyramid to merge the panoramic sky template image and the test panoramic image in which the Laplacian pyramid is constructed, and reconstructing the fused image layer by layer to achieve a sky filter effect. The resolution of the panoramic sky template image and the test panoramic image may be different, but the fusion processing used is the same.

The second embodiment of the present invention provides a computer-readable storage medium that stores one or more computer programs including a set of computer-executable instructions, which when being executed by a processor, cause the processor to perform steps of the sky filter method for panoramic images provided in the first embodiment of the present invention.

Third Embodiment

Figure 3:
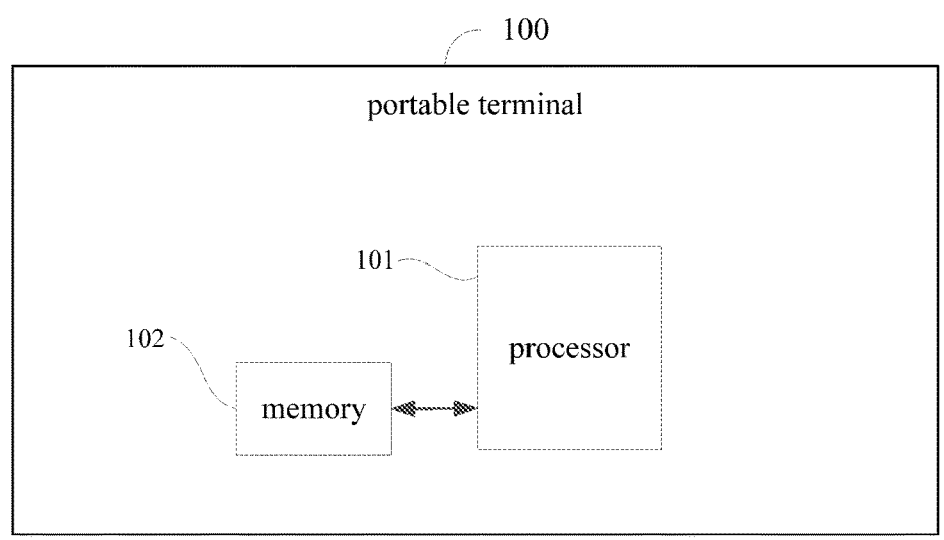
FIG. 3 is a schematic structural diagram of a portable terminal in accordance with a third embodiment of the present invention.

FIG. 3 shows a structural block diagram of a portable terminal provided in the third embodiment of the present invention. A portable terminal 100 comprises: one or more processors 101, a memory 102, and one or more computer programs, where the one or more processors 101 and the memory 102 are connected by a bus, the one or more computer programs are stored in the memory 102, and are configured to be executed by the one or more processors 101. The one or more processors 101 execute the one or more computer programs to perform steps of the sky filter method for panoramic images provided in the first embodiment of the present invention.

In the present invention, the sky region in the panoramic image is detected by the machine learning algorithm, which improves the accuracy of automatic sky detection, and the multi-resolution fusion algorithm is used to fuse the panoramic sky template image and the panoramic image to achieve the sky filter effect.

A person of ordinary skill in the art may understand that all or part of the steps in the method of the above-mentioned embodiments can be implemented by a program instructing relevant hardware. The program can be stored in a computer-readable storage medium, and the storage media can be, such as ROM/RAM, magnetic disk, optical disk, etc.

The above descriptions are only preferred embodiments of the present invention and are not intended to limit the present invention. Any modification, equivalent replacements and improvement made within the spirit and principle of the present invention shall be included in the protection of the present invention.

What is claimed is:

1. A sky filter method for panoramic images, comprising steps of:
   obtaining several panoramic images containing sky regions as a data set, and marking a sky region and a ground region of each of the panoramic images in the data set, so as to obtain a marked mask image corresponding to each of the panoramic images in the data set, and obtaining a panoramic sky template image;
   respectively extracting features of the sky region and the ground region of each of the panoramic images in the data set according to the marked mask images, and marking a positive sample and a negative sample of each of the panoramic images;
   sequentially inputting the positive sample and the negative sample of each of the panoramic images in the data set to a support-vector machine (SVM) for training, so as to obtain a model;
   extracting features of a test panoramic image, and inputting the features to the model, so as to obtain an initial mask image in which sky pixels and ground pixels are marked;
   removing misclassified pixels and misclassified regions in the initial mask image, so as to obtain a corresponding accurate mask image; and
   fusing the panoramic sky template image and the test panoramic image on the basis of the accurate mask image by using a multi-resolution fusion algorithm, and generating a fused image having a sky filter effect, by fusing the panoramic sky template image and the test panoramic image on the basis of the accurate mask image by using a multi-resolution fusion algorithm;
   wherein the features comprises a first feature set and a second feature set; the first feature set comprises: R channel value, G channel value, B channel value, and local variance; the second feature set comprises: B/G value, B/R value and a product of a row coordinate and the local variance; the first feature set and the second feature set of the sky region are marked as positive samples, and the first feature set and the second feature set of the ground region are marked as negative samples.

2. The method of claim 1, wherein the pixel value of the sky region in the marked mask image is marked as 1 and the pixel value of the ground region is marked as 0.

3. The method of claim 1, wherein the step of removing misclassified pixels and misclassified regions in the initial mask image, so as to obtain a corresponding accurate mask image, specifically comprises steps of:
   performing median filtering on the initial mask image, based on the prior knowledge of the sky in the upper part of the image and the ground in the lower part of the image, filtering out misclassified single pixels;
   convoluting and thresholding the initial mask image by using the weight map to obtain an initial mask image with noise removed; and
   removing the misclassified regions in the sky region and the ground region to obtain an accurate mask image.

4. A sky filter method for panoramic images, comprising steps of:
   obtaining several panoramic images containing sky regions as a data set, and marking a sky region and a ground region of each of the panoramic images in the data set, so as to obtain a marked mask image corresponding to each of the panoramic images in the data set, and obtaining a panoramic sky template image;
   respectively extracting features of the sky region and the ground region of each of the panoramic images in the data set according to the marked mask images, and marking a positive sample and a negative sample of each of the panoramic images;
   sequentially inputting the positive sample and the negative sample of each of the panoramic images in the data set to a support-vector machine (SVM) for training, so as to obtain a model;
   extracting features of a test panoramic image, and inputting the features to the model, so as to obtain an initial mask image in which sky pixels and ground pixels are marked;
   removing misclassified pixels and misclassified regions in the initial mask image, so as to obtain a corresponding accurate mask image; and
   fusing the panoramic sky template image and the test panoramic image on the basis of the accurate mask image by using a multi-resolution fusion algorithm, and generating a fused image having a sky filter effect, by fusing the panoramic sky template image and the test panoramic image on the basis of the accurate mask image by using a multi-resolution fusion algorithm;
   wherein the step of removing misclassified pixels and misclassified regions in the initial mask image, so as to obtain a corresponding accurate mask image, specifically comprises steps of:
   performing median filtering on the initial mask image, based on the prior knowledge of the sky in the upper part of the image and the ground in the lower part of the image, filtering out misclassified single pixels; specifically:
   setting the weight of the pixel (x, y) to p:

$$p = \left(1 - \frac{y}{H}\right)^3, y \in (0, H-1)$$

where H is the height of the image, W is the width of the image: $x \in (0, W-1)$;
   convoluting and thresholding the initial mask image by using the weight map to obtain an initial mask image with noise removed; and
   removing the misclassified regions in the sky region and the ground region to obtain an accurate mask image.

5. A sky filter method for panoramic images, comprising steps of:
   obtaining several panoramic images containing sky regions as a data set, and marking a sky region and a ground region of each of the panoramic images in the data set, so as to obtain a marked mask image corresponding to each of the panoramic images in the data set, and obtaining a panoramic sky template image;
   respectively extracting features of the sky region and the ground region of each of the panoramic images in the data set according to the marked mask images, and marking a positive sample and a negative sample of each of the panoramic images;

sequentially inputting the positive sample and the negative sample of the panoramic images in the data set to a support-vector machine (SVM) for training, so as to obtain a model;

extracting features of a test panoramic image, and inputting the features to the model, so as to obtain an initial mask image in which sky pixels and ground pixels are marked;

removing misclassified pixels and misclassified regions in the initial mask image, so as to obtain a corresponding accurate mask image; and fusing the panoramic sky template image and the test panoramic image on the basis of the accurate mask image by using a multi-resolution fusion algorithm, and generating a fused image having a sky filter effect, by fusing the panoramic sky template image and the test panoramic image on the basis of the accurate mask image by using a multi-resolution fusion algorithm;

wherein the step of removing misclassified pixels and misclassified regions in the initial mask image, so as to obtain a corresponding accurate mask image, specifically comprises steps of:

performing median filtering on the initial mask image, based on the prior knowledge of the sky in the upper part of the image and the ground in the lower part of the image, filtering out misclassified single pixels;

convoluting and thresholding the initial mask image by using the weight map to obtain an initial mask image with noise removed; and removing the misclassified regions in the sky region and the ground region to obtain an accurate mask image, further comprising steps of:

detecting the connected domains of the initial mask image with noise removed by using two-pass algorithm, calculating the area S1 of each connected domain in the sky region in the upper part of the image, setting the minimum sky area threshold th1, and dividing according to the following formula:

$$\text{area of connected domain to be detected in the sky region} = \begin{cases} \text{sky region}, & S_1 \geq th1 \\ \text{non-sky region}, & S_1 < th1 \end{cases}$$

where the value of S1 is calculated as the number of pixels in each connected domain in the sky region, and the threshold th1 is $\frac{1}{40}$ of the image area;

calculating the area S2 of each connected domain in the ground region in the lower part of the image, setting the minimum ground area threshold th2, and dividing according to the following formula:

$$\text{area of connected domain to be detected in the non-sky region} = \begin{cases} \text{sky region}, & S_2 \geq th2 \\ \text{non-sky region}, & S_2 < th2 \end{cases}$$

where the value of S2 is calculated as the number of pixels in each connected domain in the ground region, and the threshold th2 is $\frac{1}{2}$ of the maximum area of the ground connected domain; and obtaining the accurate mask image of sky region by means of the above division, and completing the detection of the sky region.

6. The method of claim 1, wherein the step of fusing the panoramic sky template image and the test panoramic image on the basis of the accurate mask image by using a multi-resolution fusion algorithm, and generating a fused image having a sky filter effect, by fusing the panoramic sky template image and the test panoramic image on the basis of the accurate mask image by using a multi-resolution fusion algorithm, comprises:

constructing a Laplacian pyramid on the panoramic sky template image and the test panoramic image by using the multi-resolution fusion algorithm; constructing a Gaussian pyramid on the accurate mask image, and using the constructed Gaussian pyramid to merge the panoramic sky template image and the test panoramic image in which the Laplacian pyramid is constructed, reconstructing the fused image layer by layer, and generating a fused image having a sky filter effect, by fusing the panoramic sky template image and the test panoramic image on the basis of the accurate mask image by using a multi-resolution fusion algorithm.

7. A non-transitory computer-readable medium that stores one or more computer programs, wherein when the one or more computer programs are executed by a processor, cause the processor to perform the steps of the method of claim 1.

8. A portable terminal, comprising:
one or more processors;
a memory; and
one or more computer programs, where the one or more computer programs are stored in the memory and are configured to be executed by the one or more processors, wherein when the one or more computer programs being executed, cause the one or more processors to perform the steps of the method of claim 1.

9. A portable terminal, comprising:
one or more processors;
a memory; and
one or more computer programs, where the one or more computer programs are stored in the memory and are configured to be executed by the one or more processors, wherein when the one or more computer programs being executed, cause the one or more processors to perform steps of the method of claim 4.

10. A portable terminal, comprising:
one or more processors;
a memory; and
one or more computer programs, where the one or more computer programs are stored in the memory and are configured to be executed by the one or more processors, wherein when the one or more computer programs being executed, cause the one or more processors to perform steps of the method of claim 5.

* * * * *